US006607267B2

(12) United States Patent
Testardi et al.

(10) Patent No.: US 6,607,267 B2
(45) Date of Patent: Aug. 19, 2003

(54) METHOD OF PRINTING A SECURITY VERIFICATION WITH INKJET PRINTERS

(75) Inventors: Stephen L. Testardi, Boise, ID (US); Brooke E. Smith, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 09/776,056

(22) Filed: Feb. 2, 2001

(65) Prior Publication Data

US 2002/0105572 A1 Aug. 8, 2002

(51) Int. Cl.[7] ........................... B41J 2/01; G06K 19/02

(52) U.S. Cl. ....................... 347/100; 347/101; 235/488; 235/470

(58) Field of Search ............................ 347/100, 96, 98, 347/101, 102, 40, 107; 427/1; 235/468, 470, 488

(56) References Cited

U.S. PATENT DOCUMENTS 5,513,563 A * 5/1996 Berson ........................ 347/15
6,162,485 A * 12/2000 Chang ........................... 427/1
6,270,213 B1 * 8/2001 Sansone et al. ............. 347/100
6,283,589 B1 * 9/2001 Gelbart ....................... 347/101
6,412,937 B1 * 7/2002 Kato et al. .................. 347/100

FOREIGN PATENT DOCUMENTS

EP 0726158 * 8/1996 .............. B41J/2/21

* cited by examiner

*Primary Examiner*—Judy Nguyen
*Assistant Examiner*—Manish S. Shah

(57) ABSTRACT

In combination with an inkjet printer having a glossy topcoat deposition feature, a method for printing security marks on an inkjet-printed sheet which includes the step of modulating the deposition of the topcoat layer, rather applying it uniformly to the imaged surface of the sheet. Modulated deposition results in variations in gloss which are visible when the document is viewed at an angle. Three alternatives for modulation are possible: the topcoat layer may be applied to the entire sheet, but with the amount thereof deposited per unit area over the surface of the document alternating between a low value and a high value; the topcoat layer may be applied to the entire sheet, but with the amount thereof deposited per unit area varying over the surface of the document as a continuous function between a low value and a high value; or the topcoat layer may be applied to only portions of the document surface. Modulated application of the topcoat can be controlled using one of several available techniques; the standard print driver can be employed in a manner similar to that used for the printing of standard images with pigmented inks; the printer may be designed to accept a custom plug-in module procurable from a secure source (e.g., the printer manufacturer) which, when enabled by the standard print driver, controls the printing of a particular security mark design; or an internet-based vendor may provide a secure downloadable security mark design in much the same manner that printable postage stamps are provided through various vendors in conjunction with the U.S. Postal Service's Information Based Indicia Program.

23 Claims, 2 Drawing Sheets

METHOD OF PRINTING A SECURITY VERIFICATION WITH INKJET PRINTERS

FIELD OF THE INVENTION

This invention relates to inkjet printing processes and, more specifically, to the application of final fixing or topcoat layers.

BACKGROUND OF THE INVENTION

Inkjet recording systems are used in a wide variety of printers and plotters because these systems generate little noise, the recording process is relatively fast, inexpensive paper media may be used for the recording process, multi-color recording is easily implemented, and the recording equipment is relatively inexpensive to manufacture and maintain. Though the cost of xerographic color printing is declining rapidly, it is unlikely that it will ever be cost-competitive with inkjet printing. In addition, xerographic color printing for plotters is impractical, at best, due to the size of the media used in many plotters. In any case, inkjet recording systems will continue to find wide acceptance in the foreseeable future.

Inkjet recording systems generally comprise three components: the printer, the ink and the recording sheet. The printer controls the size, number and placement of ink droplets and contains a media transport system. The ink provides the dyes or pigments which form the images, and the recording sheet provides the medium or substrate which accepts and holds the ink.

Inkjet printer systems currently manufactured by the Hewlett Packard Company utilize a single print head, whether for color or black and white printing. For black and white printing, a single ink reservoir is provided, while for color printing, at least four reservoirs are provided: one for black ink, and another for each of the three primary subtractive pigments cyan, magenta, and yellow. The ink reservoirs are generally arranged perpendicular to the recording medium in succession behind the print head. The print head typically has a large number of orifices associated with each color. Many modern print heads have 524 orifices per color, arranged in two vertical columns, each of which is capable of producing 300 dots-per-inch (dpi) resolution. Thus, a high-resolution color print head may have 8 columns (2 for each color ink), with each column having 262 orifices. As the two columns have an offset equal to ½ the orifice pitch of each, and the orifices of both columns are fired simultaneously, 600 dpi resolution can be achieved during a single pass of a printing head over the recording sheet. The recording medium is printed in line-by-line fashion in a printing station and is shifted by a sub-line between two line printing events, the width of the sub-line being determined by the height of the spray pattern formed by the print head on the recording medium. There are two commonly employed techniques for expelling ink from an orifice. The ink can be expelled with a transducer associated with the orifice, or the ink can be expelled therefrom by generating a steam bubble within that orifice. In the latter case, each orifice of the print head is equipped with its own resistor element, which is independently coupled to printer circuitry. In order to expel a droplet of ink from an orifice, a current pulse is sent to a resistor element positioned within the orifice. The $IR^2$ loss across the resistor element is released as heat. The heat generates a steam bubble within the orifice, which expels a droplet of ink therefrom. For a typical color inkjet printer, four ink reservoirs are generally required:

black, cyan, magenta, and yellow. Because the diameter of each orifice within the print head is only 30–40 μm-diameter, ink pigment particles are generally limited to about 1.0 μm in size. Dispersant compounds are employed to keep the pigment particles in suspension.

Referring now to the block schematic diagram of FIG. 1, an inkjet printer has a print head 101 having a nozzle plate 102 which faces a recording medium 103, such as a sheet of paper. The nozzle plate 102 has an array of orifices formed therein. Each orifice in the nozzle plate has either a transducer or a resistor associated therewith which can be driven in pulsed fashion via an electronic controller 104. Either deformation of the transducers or heating of the resistor causes an ink droplet to be expelled from its associated orifice in response to each pulse. The timing and pattern of pulse delivery to the orifice array on the nozzle plate is responsible for the printing of characters or images. The printer may be equipped with a character generator 105 that is responsible for font formation in response to the receipt of input data 106, or the input data 106 generated by an external device such as a computer, may directly drive the print pattern. The controller 104 and the character generator 105 form a control drive circuit 107. A first drive motor 108 is provided for moving the print head 101 linearly across the recording the medium in response to head advance signals 109 generated by the controller 104, while a second drive motor 110 is provided for advancing the platten 112 and attached recording medium 101 sub-line by sub-line in response to platen advance signals 111 also generated by the controller. The print head 101 is removable, having a plug and socket arrangement 115 with multiple conductors 116. The plug connector is secured on a mount 117 of the printer carriage, which is driven by the first drive motor 108.

Though the quality and archivability of ink jet prints is a function of the entire system, the composition and interaction of the ink and the recording sheet most affect the quality and archivability of the imaged product. There are two primary, competing requirements for successful inkjet printing. The first is that the surface of the print medium (generally a cellulose-containing sheet) must be sufficiently absorbent to immobilize the liquid ink vehicle so that the inks will dry quickly and not smear during high-speed printing. The second is that the surface of the medium must limit the diffusion of the printed ink dots, whether through spreading, tailing or blurring, so as to provide a sharp image. These two competing print medium qualities have been best achieved in the past by incorporating non-flake-like pigments, such as calcium carbonate, silicas, and calcined clays into the medium surface. These pigment particles are generally bound to the surface of the sheet by water-soluble polymeric binders, such as polyvinyl alcohol, polyvinyl alcohol copolymers (e.g., polyvinyl alcohol-co-vinyl-acetate), hydroxypropyl cellulose, acrylic resins (e.g., methyl methacrylate, ethyl acrylate, and acrylic acid), sodium alginate, water-soluble phenol formaldehyde resins, carboxylated styrene butadiene polymers, carbonxymethyl cellulose, hydroxyurethanes, soluble collagen gelatin, hydrolyzed ethylene vinyl acetate polymers, polysaccharides (e.g., xanthene gum, gum tragacanth, locust bean gum, guar gum, and agur), aqueous dispersions of polyvinylpyrrolidone, vinylpyrrolidone-vinyl acetate copolymers, or mixtures thereof.

SUMMARY OF THE INVENTION

In order to improve the waterfastness of an inkjet-printed document and to provide a more photographic print-like product, the Hewlett Packard Company has developed a new inkjet printer technology which employs both an undercoat agent and a topcoat, or fixing agent. As an aid to image resolution and clarity, the undercoat agent, which is applied to the surface of the recording sheet (e.g., paper) prior to the application of the imaging inks, restricts the migration of ink pigment particles. The topcoat is applied on top of the imaging inks, and forms a water-resistant glossy surface over the printed image. Both the undercoat and topcoat are formulated from water-soluble, polymeric compounds, which must be thermally-stable in order to prevent the accumulation of thermal decomposition products at the resistor element sites. An aqueous solution of polyethylene imine has been successfully employed as an undercoat. Applied as a cationic solution having a low pH value, the polymeric molecules bind to the ink pigment particles, which are applied to the recording sheet in an anionic solution. An aqueous solution of styrene maleic anhydride, applied as an anionic solution having a high pH value, has proven to be an effective topcoat. Coulombic forces bind the styrene maleic anhydride molecules to both the ink pigment particles and to the undercoat molecules.

The present invention adapts the newly-developed inkjet printer technology to provide a method for printing security marks on a printed sheet with the topcoat. It was noted during an early test of the new technology that if the topcoat solution is not evenly applied to a printed sheet, variations in gloss are visible when the sheet is viewed from an angle. From this misprint, it was realized that security marks may be printed on the surface of a document by modulating the application of the topcoat solution to produce a recognizable pattern, rather than applying it uniformly to the imaged surface thereof.

The topcoat solution is applied to the sheet in the same manner that the conventional inkjet inks are applied. That is to say, as is the case for each of the conventional inks, a separate reservoir connected to the print head is provided for the topcoat solution, and a pattern is printed on the sheet in response to signals sent to the print head by the printer driver. Alternatively, one of the printer's standard ink reservoirs may be temporarily replaced by one containing the topcoat solution.

Modulated application of the topcoat solution may take several forms. The topcoat solution may be applied to the entire sheet, but with the amount thereof deposited per unit area over the surface of the document alternating between a low value and a high value. Alternatively, the topcoat layer may be applied to the entire sheet, but with the amount thereof deposited per unit area varying over the surface of the document as a continuous function between a low value and a high value. As a final alternative, the topcoat layer may be applied to only portions of the document surface.

Modulated application of the topcoat solution can be controlled using one of several available techniques. The standard print driver can be employed in a manner similar to that used for the printing of any other graphic images and so-called "watermark" images. Although such a method is easily implemented, it suffers from the disadvantage that documents with security marks could be easily counterfeited by scanning an original document and, then, reprinting it with a printer so enabled. A second method that is far more secure than the first is to design the printer to receive a custom plug-in module which, when enabled by the standard print driver, controls the printing of a particular security mark design. A printer owner can then specify a particular security mark design and order a module corresponding to that particular design from a secure source, such as the printer manufacturer. Such a scenario makes counterfeiting a security mark much more difficult. A third method is for an internet-based vendor to provide a secure downloadable security mark design in much the same manner that printable postage stamps are provided through various vendors in conjunction with the U.S. Postal Service's Information Based Indicia Program. Just as a digital signature is created for each piece of mail, so may a digital signature be created for a particular document on which a security mark design is to be printed. That digital signature may be incorporated in the security mark itself to so that the authenticity thereof may be determined. Several approaches have been taken for the creation of digital signatures. Those include the digital signature algorithm (DSA) approach, the RSA encryption algorithm approach, and the elliptic curve signature algorithm approach (ECDSA). Other equally-secure digital signature approaches may also be developed and adopted. A discussion of these techniques is outside the scope of this disclosure. Suffice it to say that an inkjet printer is easily capable of printing a security mark or pattern which incorporates a digital signature that is subject to authentication.

As embodiments to the process where a transparent compound is used to create the security image, other inks may also be employed. For example, inks which are visible only when exposed to an activator, such as moisture, a chemical agent, or ultraviolet light, may also be used. Inks which are invisible in white light, but which phosphoresce when exposed to ultraviolet light have long been known in the art, and are readily available from numerous ink supply sources.

DETAILED DESCRIPTION OF THE INVENTION

Figure 1:
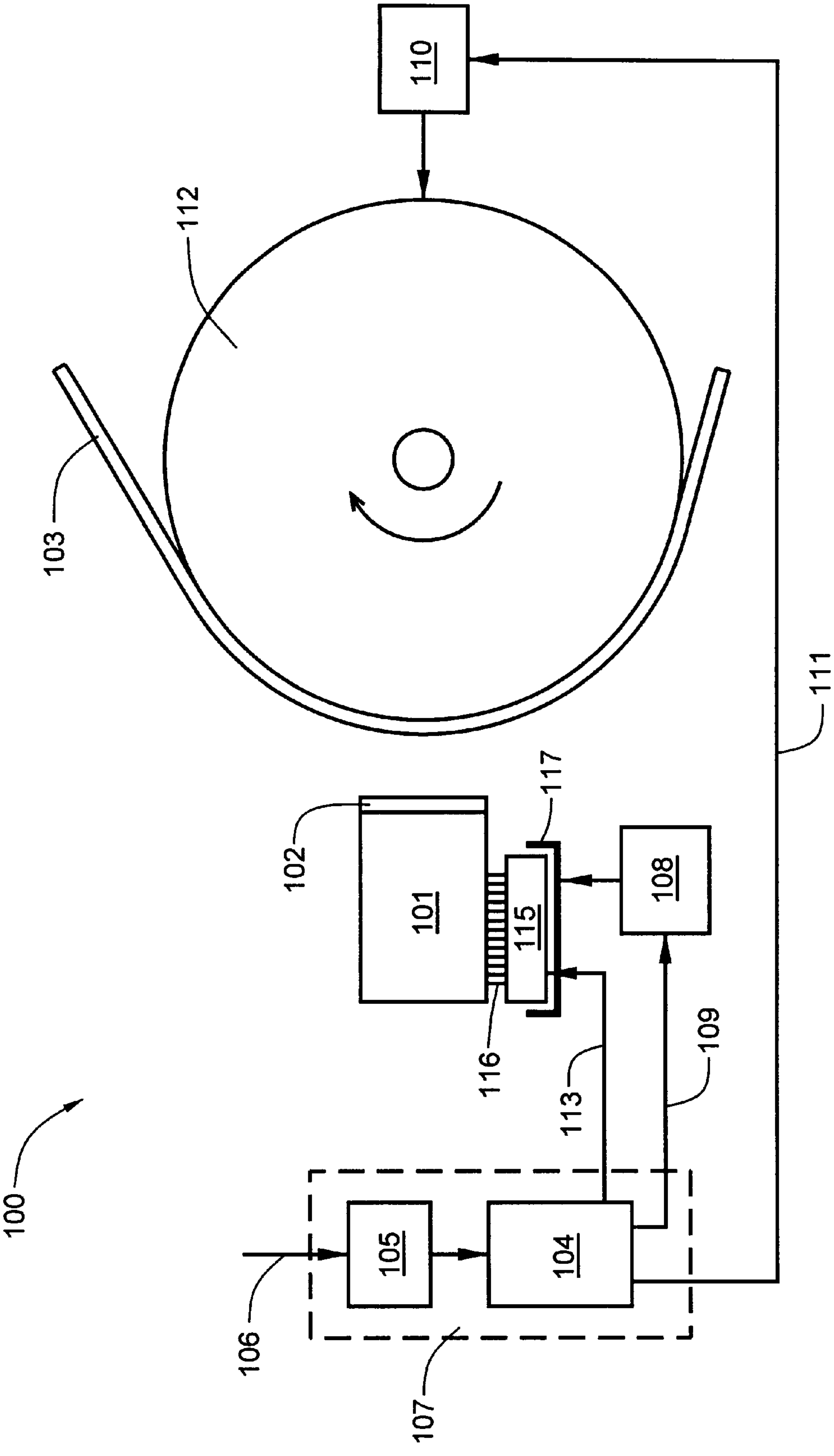
FIG. 1 is a block schematic diagram of an inkjet printer.

The present invention constitutes a method for printing a security verification pattern or mark on the face of a document. The method is practiced in combination with inkjet printer having at least one reservoir containing a clearcoat in aqueous solution and a bubble jet printer head associated therewith. For a preferred embodiment of the invention, a color printer has six reservoirs and a printhead associated with each reservoir. Four of the reservoirs contain four colors of imaging inks: black, cyan, magenta, and yellow. The other two reservoirs contain an undercoat and a topcoat, respectively. As an aid to image resolution and clarity, the undercoat, which is applied to the surface of a cellulose-containing recording sheet (e.g., paper manufactured from wood or cotton fibers) prior to the application of the imaging inks, restricts the migration of ink pigment particles. The topcoat is applied on top of the imaging inks, and forms a water-resistant glossy surface over the printed image. Both the undercoat and topcoat are formulated from water-soluble, polymeric compounds, which must be thermally-stable in order to prevent the accumulation of thermal decomposition products at the resistor element sites. An aqueous solution of polyethylene imine has been successfully employed as an undercoat. Applied as a cationic solution having a low pH value, the polymeric molecules of the undercoat bind to the ink pigment particles, which are applied to the recording sheet in an anionic solution. An aqueous solution of styrene maleic anhydride, applied as an anionic solution having a high pH value, has proven to be an effective topcoat. Coulombic forces bind the styrene maleic anhydride molecules to both the ink pigment particles and to the undercoat molecules.

Using the heretofore described printing system, security marks may be printed on the surface of a document by modulating the application of the topcoat solution to produce a recognizable pattern, rather than applying it uniformly to the imaged surface thereof.

Both the undercoat solution and the topcoat solution are applied to the sheet in the same manner that the conventional inkjet inks are applied. A typical print head may have 524 orifices for each color ink, which are arranged in two vertical columns, each of which is capable of producing 300 dots-per-inch (dpi) resolution. As the two columns have an offset equal to ½ the orifice pitch of each, and the orifices of both columns are fired simultaneously, 600 dpi resolution can be achieved during a single pass of the printing head over the recording sheet. The ink in each orifice is expelled therefrom by generating a steam bubble within that orifice or by actuating a transducer within the orifice. Each orifice of each print head is equipped with its own resistor element or transducer, which is independently coupled to printer circuitry. In order to expel a droplet of ink from an orifice, a current pulse is sent to the transducer or the resistor element positioned within the orifice. In the case of a resistor, the $IR^2$ loss across the resistor element is released as heat. The heat generates a steam bubble within the orifice, which expels a droplet of ink therefrom. In the case of a transducer, the volume within the orifice is temporarily reduced.

Figure 2:
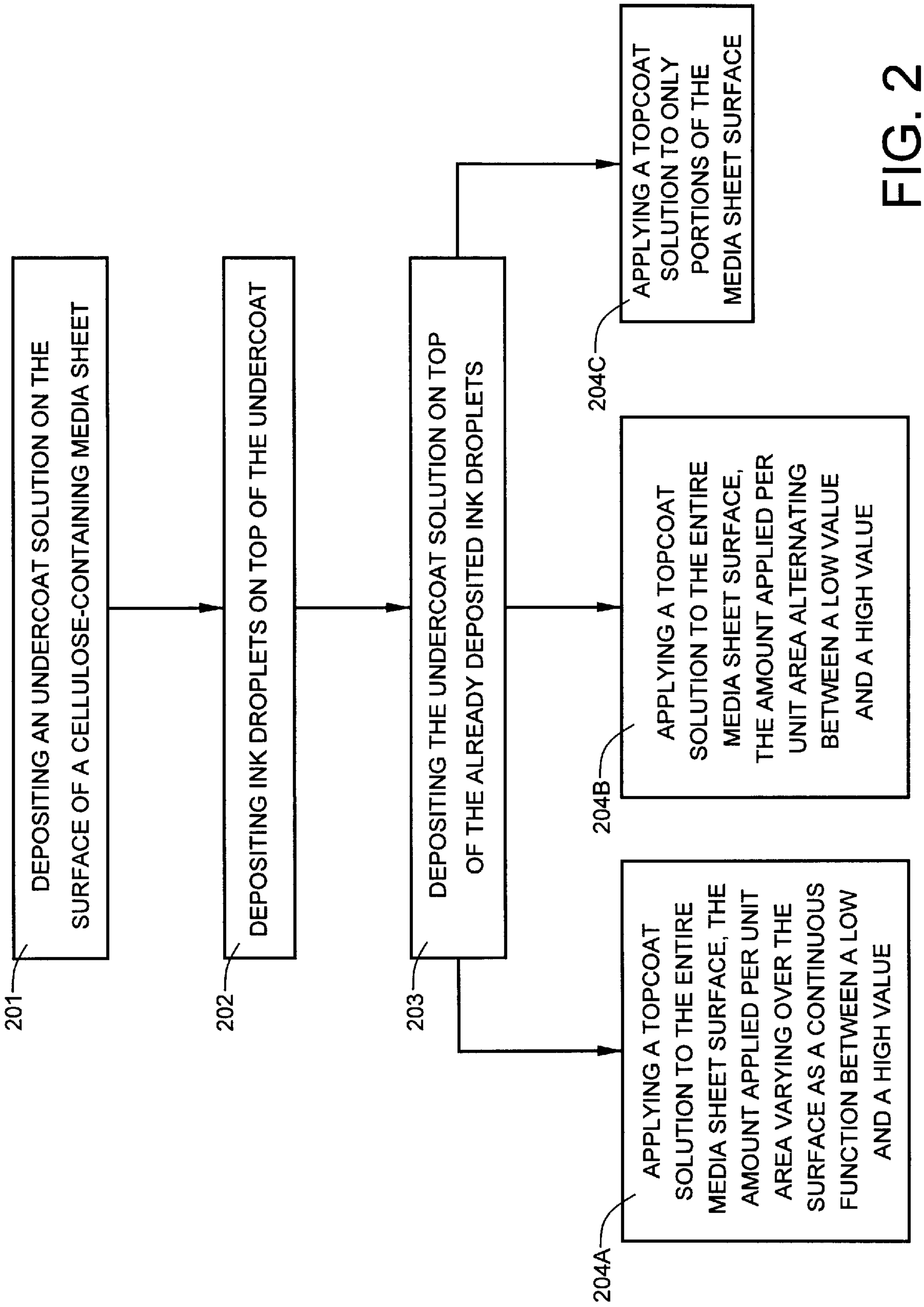
FIG. 2 is a flowchart of the steps in the process of printing a security verification with an inkjet printer.

Referring now to FIG. 2, the preferred embodiment of the printing process begins with the step of depositing droplets of a cationic undercoat solution on the surface of a cellulose containing media sheet 201. Sufficient time is allowed to pass for most of the water in the undercoat solution to evaporate. The time between passes of the print head is generally adequate to accomplish this. On the next pass of the print head, the droplets of anionic imaging ink are deposited on top of the undercoat 202. Coulombic forces bind the imaging ink droplets to the undercoat. On the next pass of the print head, additional droplets of the cationic undercoat solution are deposited on top of the imaging ink droplets 203. Coulombic forces bind the undercoat droplets to the imaging ink. On a final pass of the print head, droplets of the topcoat solution are deposited on top of the second undercoat layer. In order to produce a security verification, or pattern, on the face of the printed document, deposition of the topcoat layer is modulated.

Modulated application of the topcoat solution may take several forms. For a first modulation option 204A, the topcoat solution is applied to the entire sheet, but with the amount thereof deposited per unit area over the surface of the document alternating between a low value and a high value. For a second modulation option 204B, the topcoat layer is applied to the entire sheet, but with the amount thereof deposited per unit area varying over the surface of the document as a continuous function between a low value and a high value. For a third modulation option 204C, the topcoat layer is applied to only portions of the document surface.

Modulated application of the topcat solution can be controlled using one of several available techniques. The standard print driver can be employed in a manner similar to that used for the printing of any other graphic images and so-called "watermark" images. Although such a method is easily implemented, it suffers from the disadvantage that documents with security marks could be easily counterfeited by scanning an original document and, then, reprinting it with a printer so enabled. A second method that is far more secure than the first is to design the printer to receive a custom plug-in module which, when enabled by the standard print driver, controls the printing of a particular security mark design. A printer owner can then specify a particular security mark design and order a module corresponding to that particular design from a secure source, such as the printer manufacturer. Such a scenario makes counterfeiting a security mark much more difficult. A third method is for an internet-based vendor to provide a secure downloadable security mark design in much the same manner that printable postage stamps are provided through various vendors in conjunction with the U.S. Postal Service's Information Based Indicia Program. Just as a digital signature is created for each piece of mail, so may a digital signature be created for a particular document on which a security mark design is to be printed. That digital signature may be incorporated in the security mark itself to so that the authenticity thereof may be determined. Several approaches have been taken for the creation of digital signatures. Those include the digital signature algorithm (DSA) approach, the RSA encryption algorithm approach, and the elliptic curve signature algorithm approach (ECDSA). Other equally-secure digital signature approaches may also be developed and adopted. A discussion of these techniques is outside the scope of this disclosure. Suffice it to say that an inkjet printer is easily capable of printing a security mark or pattern which incorporates a digital signature that is subect to authentication.

As embodiments to the process where a transparent compound is used to create the security image, other inks may also be employed. For example, inks which are visible only when exposed to an activator, such as moisture, a chemical agent, or ultraviolet light, may also be used. Inks which are invisible in white light, but which phosphoresce when exposed to ultraviolet light have long been known in the art, and are readily available from numerous ink supply sources. U.S. Pat. No. 5,684,069, discloses such an ink. Additionally, U.S. Pat. No. 4,531,203 discloses an invisible ink containing a dissociable transition metal salt such as $CuSO_4$. Images formed with the ink develop virtually instantaneously when a liquid developer containing a solubilized color precursor (e.g., thiooxalic amide), which complexes with the dissociated transition metal ion, is applied thereto. Many other combinations of precursor and developer are known in the art of cryptography.

Although only several embodiments of the method for creating a security mark on the face of a document using modulated deposition of a topcoat solution are disclosed herein, it will be obvious to those having ordinary skill in the art of inkjet print technology that changes and modifications may be made thereto without departing from the invention as hereinafter claimed.

What is claimed is:

1. In combination with an inkjet printer capable of depositing a clear topcoat layer on top of ink pigments making up a printed image, a method for printing a security verification pattern on a printed surface of a document, said method comprising the step of modulating the deposition of the topcoat layer on the printed surface, so as to produce a recognizable pattern attributable to variations in thickness of the topcoat layer.

2. The method of claim 1, wherein said topcoat layer is glossy.

3. The method of claim 1, wherein the topcoat layer is applied to the entire sheet, but with the amount thereof deposited per unit area over the surface of the document alternating between a low value and a high value.

4. The method of claim 1, wherein the topcoat layer is applied to the entire sheet, but with the amount thereof deposited per unit area varying over the surface of the document as a continuous function between a low value and a high value.

5. The method of claim 1, wherein the topcoat layer is applied to only portions of the document surface.

6. The method of claim 1, wherein said topcoat phosphoresces in the visible region of the electromagnetic spectrum when exposed to radiant energy in the ultraviolet region thereof.

7. The method of claim 1, wherein modulation is achieved by depositing the topcoat layer under control of a software driver installed on a computer system coupled to the printer, as directed by security mark data stored in modifiable memory accessible by the computer system.

8. The method of claim 1, wherein said topcoat is transparent until treated with a developer solution.

9. The method of claim 1, wherein modulation is achieved by depositing the topcoat layer under control of a software driver installed on a computer system coupled to the printer, as directed by security mark data stored in a read-only memory module obtainable as a separate item from the printer manufacturer.

10. The method of claim 1, wherein modulation is achieved by depositing the topcoat layer under control of a software driver installed on a computer system coupled to the printer, as directed by security mark data provided over a secure connection within a distributed computing network.

11. The method of claim 1, wherein said topcoat is transparent until treated with a developer solution.

12. A method for printing a document having a security verification pattern thereon, said method comprising the steps of:

providing an inkjet printer having separate reservoirs for at least one imaging ink and a topcoat solution, each reservoir having associated therewith an array of orifices in a matrix print head, each of said inks and said topcoat solution having a volatile carrier agent;

depositing ink droplets on a major surface of a cellulose-containing sheet using at least one print head;

depositing droplets of topcoat solution on the major surface in a modulated pattern of non-uniform coverage and allowing the volatile carrier agents to evaporate, thereby revealing a recognizable security verification pattern characterized by differences in gloss attributable to the non-uniform coverage of the major surface with topcoat.

13. The method of claim 12, wherein said topcoat solution is converted to a glossy layer through the evaporation of the volatile carrier agent.

14. The method of claim 12, wherein the topcoat solution is applied to the entire sheet, but with the amount thereof deposited per unit area over the surface of the document alternating between a low value and a high value.

15. The method of claim 12, wherein the topcoat solution is applied to the entire sheet, but with the amount thereof deposited per unit area varying over the surface of the document as a continuous function between a low value and a high value.

16. The method of claim 12, wherein the topcoat solution is applied to only portions of the document surface.

17. The method of claim 12, which further comprises the step of depositing an undercoat solution beneath the ink droplets.

18. The method of claim 17, wherein said undercoat is a cationic solution and said ink and said topcoat are anionic solutions.

19. The method of claim 12, wherein deposition of the topcoat solution is controlled by a software driver installed on a computer system coupled to the printer, as directed by security mark data stored in modifiable memory accessible by the computer system.

20. The method of claim 12, wherein deposition of the topcoat solution is controlled by a software driver installed on a computer system coupled to the printer, as directed by security mark data stored in a read-only memory module obtainable as a separate item from the printer manufacturer.

21. The method of claim 12, wherein deposition of the topcoat solution is controlled by a software driver installed on a computer system coupled to the printer, as directed by security mark data provided over a secure connection within a distributed computing network.

22. The method of claim 12, wherein the non-volatile elements of said topcoat solution phosphoresces in the visible region of the electromagnetic spectrum when exposed to radiant energy in the ultraviolet region thereof.

23. In combination with an inkjet printer capable of depositing a clear glossy topcoat layer on top of ink pigments deposited to form a printed image, a method for printing a security verification pattern on the printed surface of a document, said method comprising the step of non-uniformly depositing topcoat on the printed surface in order to create at least two regions of disparate glossiness.

* * * * *